April 27, 1965
C. EMMONS
3,180,006
GROOVING TOOL
Filed Aug. 13, 1959
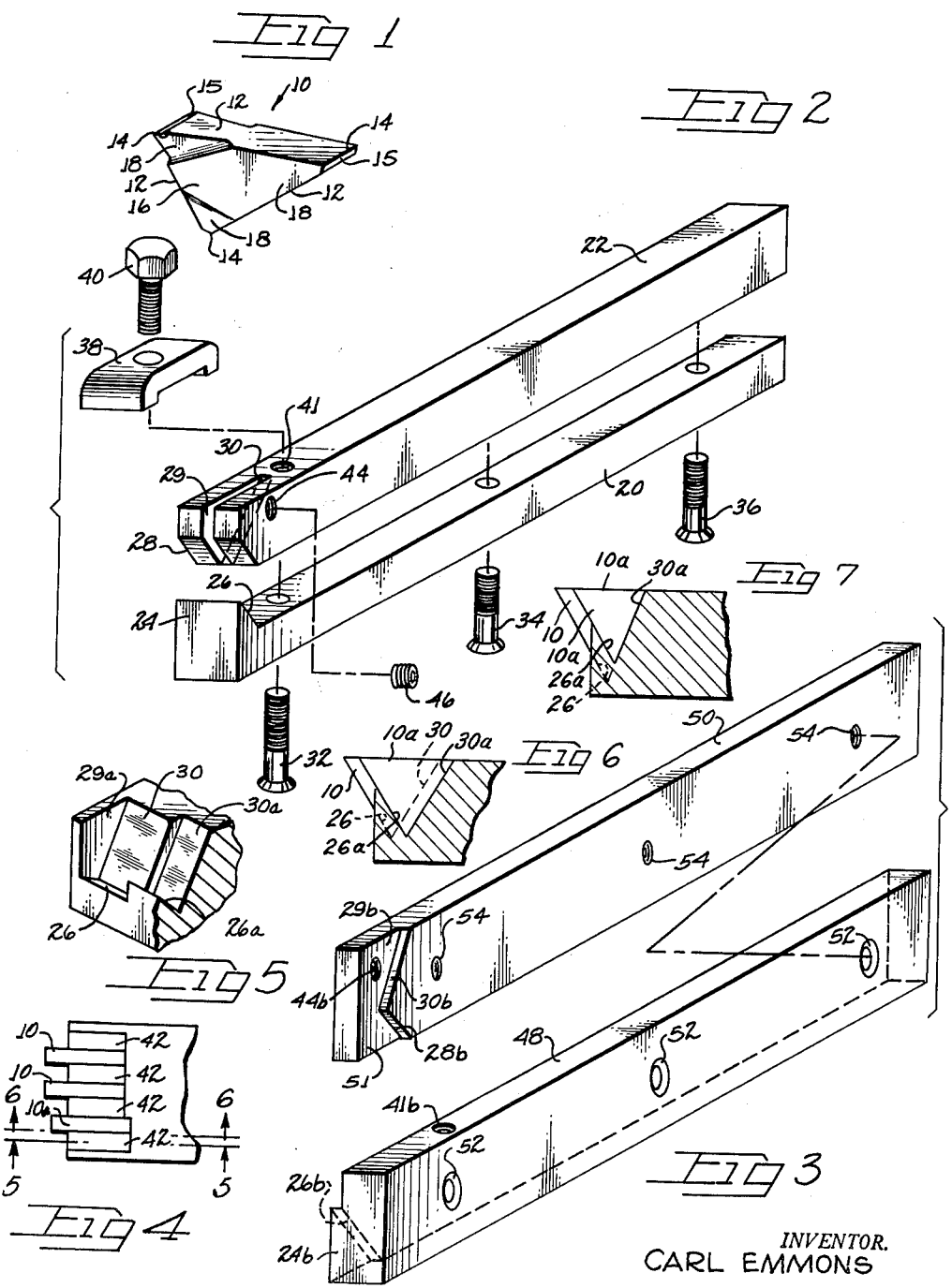
INVENTOR.
CARL EMMONS
BY
WILSON, LEWIS & McRAE

United States Patent Office 3,180,006
Patented Apr. 27, 1965

3,180,006
GROOVING TOOL
Carl Emmons, Michigan Center, Mich., assignor to U.S. Tool and Cutter Company, Franklin, Mich., a partnership
Filed Aug. 13, 1959, Ser. No. 833,529
14 Claims. (Cl. 29—97)

The present invention relates to a grooving tool and more particularly to a tool bit and tool holder especially adapted for cutting grooves in the outer diameter of cylindrical objects such as, for example, the cutting of piston ring grooves in pistons.

Prior to the present invention there have been various cutting tools which have utilized a holder having a replaceable carbide tool bit positioned thereon. However, such prior art devices have utilized tool bits which present only a conventional cutting edge to the work piece. Such cutting edges must not only be fed into the work to determine the depth of the cut but must also be moved laterally along the work piece to determine the width of the cut. The face on which the cutting edge is formed is either too wide for successful grooving operations or it is not possible to utilize the entire width of the face for cutting a groove.

Further, some prior art cutting tools utilizing a holder having a replaceable carbide tool bit have utilized means for holding the tool bit in the holder that require holes through the bit or complicated machining thereof. It is desirable to avoid machining of the tool bit because of its hardness and because of the cost of such machining operations.

Accordingly, it is the principal object of the present invention to provide a cutting tool wherein a replaceable tool bit is retained on edge in a holder so that the cutting edge presented by the tool to the work piece extends across the full width of the bit and such full width is utilized to cut a groove in the work piece.

Another object of the present invention is to provide novel means for mounting a tool bit in a grooving tool that produces the following novel results:

(1) The tool bit is self-locating and self-locking.
(2) Pressure exerted on the cutting edge of the tool bit during a cutting operation serves only to more firmly seat the bit in the grooving tool.
(3) Pressure exerted on the cutting edge of the tool bit during a cutting operation does not produce lateral stresses on the bit thereby eliminating vibration of the bit and fracture thereof and increasing the life of the bit.
(4) An infinite variation in positioning of a plurality of tool bits in the tool is possible thereby providing for variation in the lateral spacing and depths of grooves to be cut in the work piece by the tool and also making it possible to work on different diameters of a work piece at the same time.

Another object of the present invention is to provide such a cutting tool wherein the tool bit is accurately and easily positioned by mounting means not requiring special machining of the tool bit.

A further object of the present invention is to provide a novel tool bit for a grooving tool whereby the cutting edge presented by the tool bit to the work piece is accurately dimensioned to predetermine the width of the cut which will be made as the cutting edge is indexed into the work piece.

Another object of the present invention is to provide a tool holder of novel construction which is readily adaptable to mass production methods but which provides seating means for a tool bit that easily and precisely locates said bit.

Other objects of this invention will appear in the following description and appended claims, reference being had to the accompanying drawings forming a part of this specification wherein like reference characters designate corresponding parts in the several view.

In the drawings:

FIG. 1 is a perspective view of a tool bit embodying the present invention,

FIG. 2 is an exploded view of a tool holder embodying the present invention,

FIG. 3 is an exploded view of a modificaion of the tool holder of the present invention, FIG. 4 is a top plan view of one end of a further modification of a tool holder of the present invention showing a plurality of tool bits positioned therein, and FIG. 5 is a fragmentary perspective view taken on the line 5—5 of FIG. 4 with the tool bits removed.

FIG. 6 is a sectional view taken on the line 6—6 of FIG. 4.

FIG. 7 is a sectional view similar to FIG. 6 and showing a further modification of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIG. 1 of the drawings, the tool bit 10 of the present invention is formed of carbide or similar hard metal and is illustrated in the shape of an equilateral triangle. The edge faces 12 form three cutting edges 14 at the junction of adjacent edge faces. Thus, the bit has three cutting edges and when one cutting edge is dulled the bit may be removed from its holder and reinserted to present a new cutting edge to the work piece. The side faces 16, only one of which is visible in FIG. 1, may be ground at their corners as at 18 to clear the cutting edges 14. As is illustrated in FIG. 1, the flat edge faces 12 are perpendicular to the side faces 16. The width of the slot which will be cut in the work piece is determined by the width of the cutting edge 14. In grinding the corners of the side faces 16 to relieve the cutting edges it is preferable not to decrease the width of the cutting edges 14 so that they will remain the same width as the edge faces 12 of the insert for a purpose which will become apparent hereinafter. The cutting edge 14 is also given a front clearance by grinding away a portion of the edges 12 as at 15.

In FIG. 2 of the drawings the holder for the tool bit is illustrated. The holder comprises a generally rectangular bottom portion 20 and a generally rectangular top portion 22. At the front end thereof, the bottom portion 20 is provided with an upward extension 24 to form a sloped seating surface 26 that slopes downwardly and rearwardly from the front end of the holder.

The lower front edge of the top portion 22 of the tool holder is cut rearwardly and downwardly to form an engaging face 28 to matingly engage the sloped seating surface 26 of the bottom portion of the tool holder. In the front end of the top portion 22 of the tool holder a slot 29 is cut to form the sloped seating face 30 that slopes upwardly and rearwardly. The sloped seating faces 26, 30 are normal to the vertical plane of slot 29.

The top and bottom portions of the tool holder are assembled by means of bolts 32, 34 and 36 or the like. The bolts 32, 34 and 36 extend through the bottom portion 20 and are threaded into tapped bores (not shown) in the top portion 22.

It can be seen that with the top and bottom portion of the tool holder assembled together the seating face 26 and the seating face 30 diverge from each other upwardly toward the top of the tool holder. Two adjacent edge faces 12 of the insert 10 are received on these seating faces. Thus, the diverging seating faces form a seat into which the tool bit 10 is forced more firmly by the pressure exerted on the cutting edge 14 when the tool is in use. The seating face 30 is approximately equal in length to the length of an entire edge face 12. However, the seating face 26 is shorter and does not completely cover the edge face 12 of the tool bit which is seated thereon and thereby a cutting edge 14 of the tool bit is positioned outwardly from the front end of the tool holder. It is to be noted also that the included angle between the sloping faces 26 and 30 is equal to 60°. The bisector of this angle is generally perpendicular to the longitudinal axis of the tool holder and the entire tool is tilted longitudinally to provide a positive or negative rake for the tool bit. If desired, however, the seating faces may be cut so as to initially position the tool bit with a negative or positive rake when the tool is horizontal.

A clamping dog 38 is retained above the rear portion of the slot 29 by means of a bolt 40 that threads into a tapped bore 41 provided in the top face of the tool holder.

It has been found that in using the grooving tool of the present invention the tool bit will remain within the slot 29 during the cutting operation with no clamping means whatsoever. Thus, the major purpose of the clamping dog 38 is as a chip breaker. Thus, no special machining of the tool bit 10 is necessary to provide engagement means for clamping mechanisms as are utilized by prior art devices. However, the use of the dog 38 as a clamping means is desirable since it aids in retaining the tool bit 10 within the slot 29 while the grooving tool is being handled and set up.

Referring to FIG. 4 of the drawings, there is shown a top plan view of the front end of a modified tool holder showing a plurality of tool bits 10, 10 and 10a seated therein. As has been stated hereinbefore, the width of the cutting edges 14 of the tool bit are preferably kept equal to the total width of the edge faces 12. If it is desired to cut only one groove, this width and the width of the slot 29 are equal so that the tool bit will fit snugly in the slot as in the tool holders illustrated in FIGS. 2 and 3. However, in the majority of cases the sizes of the grooves which it is desired to cut and the numbers and depth thereof will vary so that it is preferable to have a grooving tool which will be readily adaptable for different situations. In FIG. 4 the slot is wide enough to accommodate a plurality of tool bits 10, 10 and 10a and spacing blocks 42. The tool bits 10, 10 and 10a may be of varying width depending upon the width of the grooves which are to be cut. The spacing blocks 42 which are interposed between the side faces of adjacent tool bits determine precisely the distance between the adjacent side faces, and thus determine precisely the distance between adjacent edges of the grooves which it is desired to cut. The blocks 42 which are positioned between the sides of the slot and the outer side faces of the tool bit need not be so accurately dimensioned as their purpose is to fill in the slot.

Additionally, referring to FIG. 4, it will be noted that the tool bit 10a extends a shorter distance past the end of the tool holder. This is accomplished in one way by varying the location of the seating faces as illustrated in FIG. 5. FIG. 5 is a perspective view taken along the line 5—5 of FIG. 4 with the tool bits removed to expose the seating faces. It will be noted that the slot 29a is stepped horizontally, i.e., the seating face 30a can clearly be seen as being spaced further from the front of the tool holder than the seating face 30. The seating face 26a that cooperates with face 30a is also further back as compared to face 26. Thus, the seat for tool bit 10a of FIG. 4 formed by the seating faces 26a and 30a is stepped back from the end of the tool holder. At the same time, the vertical location of the seats is kept the same so that the top edges of the bits 10, 10 and 10a are even.

The just described modification of the seats is used if it is desired to utilize tool bits of equal dimensions (FIG. 6). Another way of accomplishing the same results is to utilize tool bits of different sizes. For example, if tool bit 10a is smaller than tool bits 10 it will consequently extend a shorter distance past the end of the tool holder than tool bits 10. By using a tool bit 10a of smaller size than tool bits 10 it would not be necessary for the slot 29a to be stepped horizontally. At the same time, however, if it is desired to maintain the cutting edge of tool bit 10a at the same height as the cutting edges of tool bits 10, the seating faces 26a–30a will be raised in respect to seating faces 26–30 to compensate for the difference in size of the tool bits thus producing a vertically stepped configuration of the slot 29a (FIG. 7).

Although only one stepped seat is illustrated it is within the contemplation of the present invention to provide as many of such steps as may be desired for any specific groove cutting operation so that grooves of varying depth may be cut at one time or grooves may be cut simultaneously on different diameters of a work piece.

Referring again to FIG. 2, in order to aid in the locating of the tool bits 10 within the slot 29, it is sometimes desirable to use clamping means which will urge the tool bits against one side of the slot. For this purpose, a tapped bore 44 may be provided through one side of the tool holder and opening into the slot 29. The set screw 46 is threaded into this bore to urge the tool bit or the tool bits and spacing blocks against the opposite side of the slot 29.

Referring to FIG. 3 of the drawings, a modified form of the tool holder embodying the present invention is illustrated. In this embodiment there is a flat rectangular bar which serves as the right hand half 48 of the tool holder. The front end of the right half is provided with the sideward extension 24b to form a sloped seating surface 26b.

The left half 50 of the tool holder is a flat rectangular bar having the same general dimensions as the right half 48. The left half 50 is cut back at its lower front corner rearwardly and downwardly to form a recess 51 to receive the projection 24b of the right half of the tool holder. The rear face 28b of the recess 51 mates with the seating surface 26b but leaves the upper portion of the seat surface 24b uncovered. A further recess 29b is provided in the upper right corner of the left half 50 of the tool holder. The rear face 30b of this recess 29b slopes backwardly to provide a sloped seating face comparable to the sloped seating face 30 of the tool holder shown in FIG. 2.

The two halves 48 and 50 are assembled in side by side relation by means of bolts (not shown) passing through the bores 52 provided in the right half and threaded into the tapped bores 54 in the left half 50. A tapped bore 41b is provided on the top of the right half 48 of the holder to threadingly receive a bolt (not shown) to affix the clamping dog in the same manner as illustrated in FIG. 2. In the same manner, the tapped bore 44b is provided through the left half 50 of the tool holder and opening into the slot 29b for the same purpose as described in connection with the tool holder of FIG. 2.

From the above description, it can be seen that the present invention provides a grooving tool wherein a replaceable tool bit of triangular shape is retained with the side faces of the triangle in a vertical position to present to a work piece one of a plurality of cutting edges formed by the juncture of adjacent edge faces of the tool bit. The tool bit is positively seated in the tool holder by means of diverging seating faces which form a V-shaped seat and pressure exerted on the cutting edge of the tool bit serves only to more firmly seat the bit in its seat. There is no room for error in the positioning of the tool bit in the holder so that the skill of the operator need not be relied upon to correctly position the tool. Additionally, this means of setting the tool bit in the tool holder eliminates any complicated machining of the tool bit which has hitherto been required in order for the tool bit to be engaged by holding means.

What is claimed is:

1. A grooving tool comprising: a tool bit holder having an upwardly opening vertical triangular slot therein defining a seat for a tool bit, the base of said slot comprising upwardly diverging flat seating faces normal to the vertical plane of the slot, and a triangular tool bit positioned vertically in said slot and having flat lower edge faces seated on said diverging seating faces and having a cutting edge projecting from said holder whereby forces directed against said cutting edge during a grooving operation urge the lower flat edge faces of said tool bit against the flat faces of its seat in said holder.

2. A grooving tool comprising: a tool bit holder having an upwardly opening vertical triangular slot therein defining a seat for a plurality of tool bits, the base of said slot comprising pairs of upwardly diverging seating faces with said pairs of seating faces spaced along said holder but at the same height, a plurality of triangular tool bits positioned vertically in said slot and each of said tool bits having lower edge faces seated on one of said pairs of diverging seating faces with a cutting edge extending from said holder whereby the cutting edges of said tool bits are staggered in predetermined fashion as determined by the spacing of said pairs of seating faces.

3. A grooving tool comprising: a tool bit holder having an upwardly opening vertical triangular slot therein defining a seat for a plurality of tool bits, the base of said slot comprising diverging seating faces, a plurality of triangular tool bits of various sizes positioned vertically in said slot and each having lower edges seated on said seating faces with a cutting edge extending from said holder with the cutting edges of said tool bits being staggered horizontally as determined by the difference in the sizes of said tool bits.

4. A grooving tool as claimed in claim 3 and further characterized in that said slot defines a plurality of pairs of seating faces to seat said plurality of tool bits, said pairs of seating faces being staggered vertically to compensate for the difference in the sizes of said tool bits in amounts effective to position the top faces of all of said tool bits at the same level.

5. A grooving tool comprising: a generally rectangular holder having a vertical triangular slot extending inwardly from the front top edge thereof and opening along the front and top thereof, the base of said slot comprising first and second diverging flat seating faces normal to the vertical plane of the slot, said first seating face meeting the front of said holder at a distance below said top edge and said second seating face meeting the top of said holder at a greater distance from said edge; and a triangular tool bit positioned vertically in said holder with a first edge face thereof seated on and in coplanar engagement with said first seating face and extending outwardly past the front of said holder, a second edge face seated on and in coplanar engagement with said second seating face and a third edge face normal to the vertical plane of the slot and extending between said first and second edge faces and forming a cutting edge at its juncture with said first edge face.

6. A tool holder of generally rectangular shape having a top face and an end face intersecting in an end edge, said holder having a triangular slot extending inwardly from said end edge thereof, said slot having side walls which are normal to the top and end faces of said holder, said slot opening along both said end and said top faces with the base of said slot forming diverging seating faces one of which extends to said end face at a distance from said end edge and the other of which extends to said top face at a greater distance from said end edge.

7. A tool holder comprising: a bottom portion having a flat upper face with an upwardly extending portion at one end thereof providing a first flat seating face sloping downwardly and rearwardly to join said flat upper face; an upper portion having a flat lower face positioned on said upper face of said lower portion and a flat sloping face extending upwardly and endwardly from said flat lower face and matingly engaged with said first named seating face; a tool bit receiving slot formed in said upper portion at the same end as said sloping face, said slot extending in a plane normal to said faces and exposing a portion of said first mentioned seating face with the base of said slot providing a second seating face diverging from said first mentioned seating face; said first and second seating faces forming a triangular seat for a triangular tool bit and both being normal to the plane of said slot; and means to retain said upper portion and said lower portion in assembled relation.

8. A tool holder comprising: a first side portion having a flat inner face, a corner portion extending from said face at one end thereof to provide a first seating face normal to said flat face and extending across one corner thereof; a second side portion having a flat inner face positioned on the aforementioned inner face of said first side portion; a first recess in the second mentioned inner face to receive the corner projection on said first mentioned inner face, said first recess having a wall normal to said second mentioned inner face and engaging the lower portion of said first seating face; a tool bit receiving recess in said second mentioned inner face exposing the upper portion of said first seating face; the base of said tool receiving recess being normal to said second inner face and diverging upward from said first seating face to form a second seating face; said first and second seating faces forming a triangular seat to receive a triangular tool bit; and means to hold said first side portion and said second side portion in side by side assembled relationship.

9. A grooving tool comprising a shank having a forward end including a front surface, a top surface and a pair of side surfaces; said shank comprising upper and lower elongated elements releasably secured together; said shank having a vertical slot of substantially equilateral triangle shape in the forward end between the side surfaces thereof; said slot including a first flat seating surface formed in said upper elongated element and diverging towards the rearward end of the shank and extending to the top surface of the shank; said slot including a second flat seating surface formed in said lower elongated element and diverging towards the forward end of the shank and extending to the front surface of the shank at a point beneath the top surface thereof; said seating surfaces being normal to the vertical plane of the slot; and a tool bit of substantially equilateral triangle shape positioned in said slot and having flat lower faces seated on said first and second seating surfaces in coplanar engagement therewith; said tool bit having a cutting edge projecting forwardly from the forward end of the shank whereby forces directed against said cutting edge during a grooving operation urge said tool bit against its seat in the shank.

10. A grooving tool comprising a holder having a generally vertically disposed end face and a vertically extending, upwardly opening recess therein adjacent said end face, said recess being defined in part by a flat vertical side wall, a rear wall and a front wall, said front and rear walls diverging upwardly at an angle, said front and rear walls being flat and normal to the vertical plane of the side wall of the recess, said front wall intersecting said end face below the top of the holder so that the recess is open at both said end face and the top of the holder and a triangularly shaped tool bit seated in the recess, said tool bit having a pair of diverging flat edge faces in coplanar seating engagement with said front and rear walls of the recess and with one corner portion of the tool bit projecting outwardly of the recess beyond said end face, said corner portion being provided with a cutting edge extending across the full width of the tool bit outwardly beyond the end face of the holder, said tool bit also having a pair of flat parallel opposed side faces and means for preventing displacement of the tool bit in a direction normal to the plane of said side wall of the recess.

11. A tool as called for in claim 10 wherein said cutting edge is defined by two intersecting surfaces normal to the plane of said side faces.

12. A tool as called for in claim 10 wherein the flat edge faces of the tool bit are normal to the side faces of the tool bit.

13. A tool as called for in claim 10 wherein the holder is provided with a pair of upright side walls and the recess is spaced inwardly from and between said side walls.

14. A tool holder having a top face and an end face intersecting in an end edge, said holder having a triangular slot extending inwardly from said end edge thereof, said slot having at least one side wall lying in a vertical plane, said slot opening along both said end and said top faces with the base of the slot forming flat diverging seating faces one of which extends to said end face at a distance from said end edge and the other of which extends to said top face at a greater distance from said end edge, said seating faces being normal to said side wall of the slot.

References Cited by the Examiner

UNITED STATES PATENTS

| | | | |
|---|---|---|---|
| 466,327 | 1/92 | Cooke | 29—96 |
| 1,920,035 | 7/33 | Stephens | 29—96 |
| 2,458,946 | 1/49 | Johnston | 29—98 |
| 2,674,028 | 4/54 | Kontra | 29—95 |
| 2,677,170 | 5/54 | Kuns | 29—95 |
| 2,711,892 | 1/55 | Fulke | 29—96 |
| 2,780,856 | 2/57 | Traycoff | 29—96 |
| 2,805,467 | 9/57 | Greenleaf | 29—105 |
| 2,838,827 | 6/58 | Wright | 29—96 |
| 2,870,523 | 1/59 | Richard | 29—96 |

WILLIAM W. DYER, JR., *Primary Examiner.*